(12) United States Patent
Fuller

(10) Patent No.: US 11,119,256 B2
(45) Date of Patent: Sep. 14, 2021

(54) RETROREFLECTOR WITH LOAD-BIASED HINGES

(71) Applicant: THE AEROSPACE CORPORATION, El Segundo, CA (US)

(72) Inventor: Jerome K. Fuller, Van Nuys, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 184 days.

(21) Appl. No.: 16/374,340

(22) Filed: Apr. 3, 2019

(65) Prior Publication Data
US 2020/0319385 A1 Oct. 8, 2020

(51) Int. Cl.
*G02B 5/13* (2006.01)
*G01B 11/25* (2006.01)

(52) U.S. Cl.
CPC ............ *G02B 5/13* (2013.01); *G01B 11/25* (2013.01)

(58) Field of Classification Search
CPC . G02B 5/12; G02B 5/13; G01B 11/25; G01B 11/245; H01Q 15/18; G01S 13/955; G01S 7/4052; G01S 2007/4091; G01N 2021/062; G01N 2021/12; G01N 2021/551; G01N 2021/8422; G01N 2021/8477; G01N 2021/8819; G01N 2021/9515; G01N 21/55; G01N 21/4788; G01N 21/95; G01N 21/8806
See application file for complete search history.

(56) References Cited

U.S. PATENT DOCUMENTS 3,451,060 A * 6/1969 Edwards ................ H01Q 15/20
342/8

* cited by examiner

*Primary Examiner* — Mustak Choudhury
(74) *Attorney, Agent, or Firm* — One LLP

(57) ABSTRACT

Many in the space weather community consider our understanding of the buoyancy of the thermosphere and its effects on the orbits of satellites in Low Earth Orbit (LEO) to be insufficient during short time frames. Disclosed herein is an approach for making on-demand thermosphere buoyancy measurements using a deployable low mass retroreflector with CubeSat-like dimensions. A CubeSat storing many retroreflectors can dispense one or more of these passive satellites according to a predetermined schedule or on-command, in response to an observed space weather phenomenon like a coronal mass ejection. With measurements of the orbit decay from these passive satellites, a better understanding of the relationship between space weather and orbital decay can be established with relatively low cost.

19 Claims, 16 Drawing Sheets

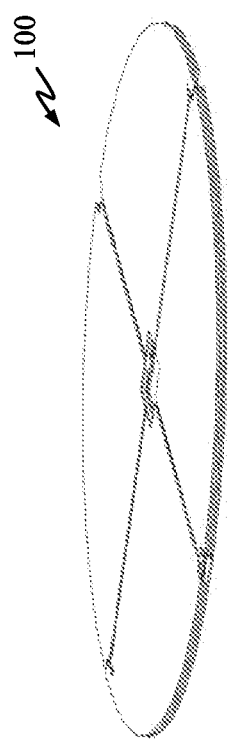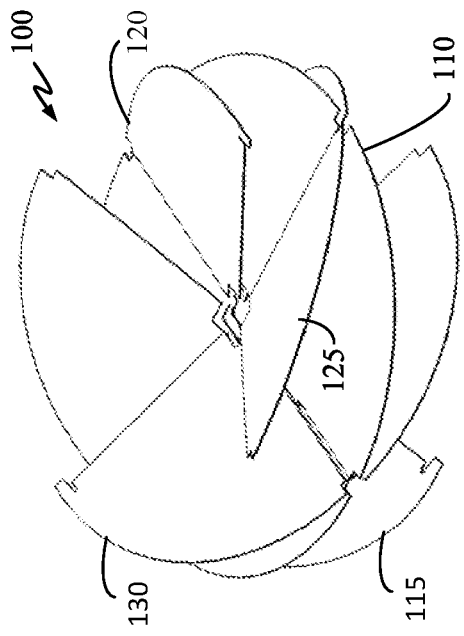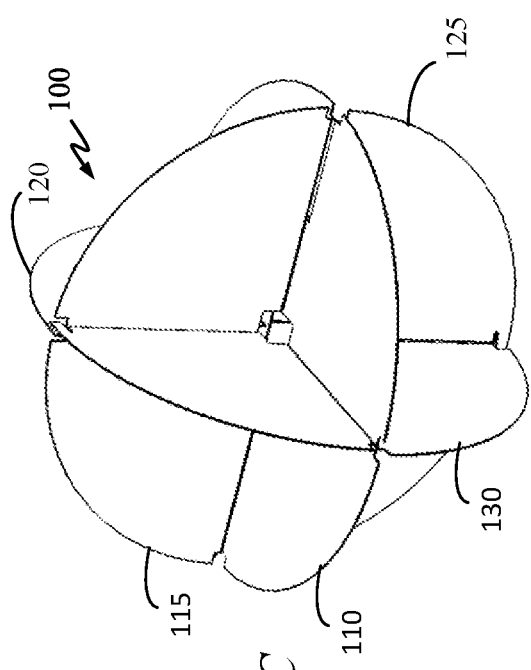
FIG. 2A
FIG. 2B
FIG. 2C

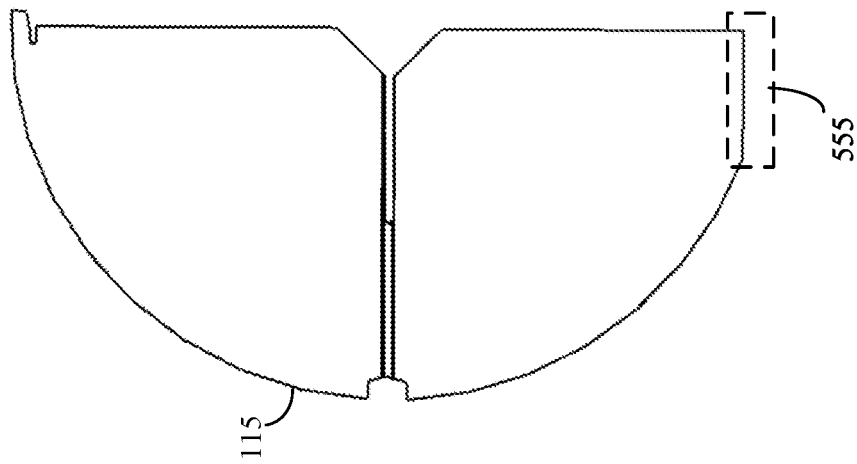

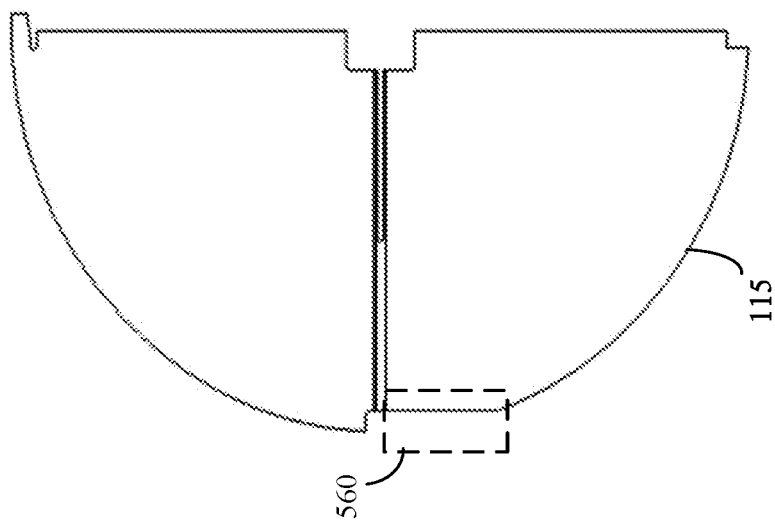

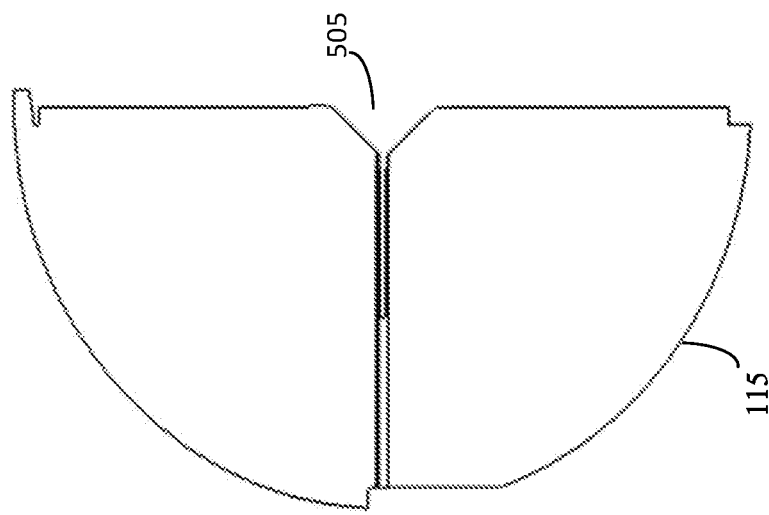

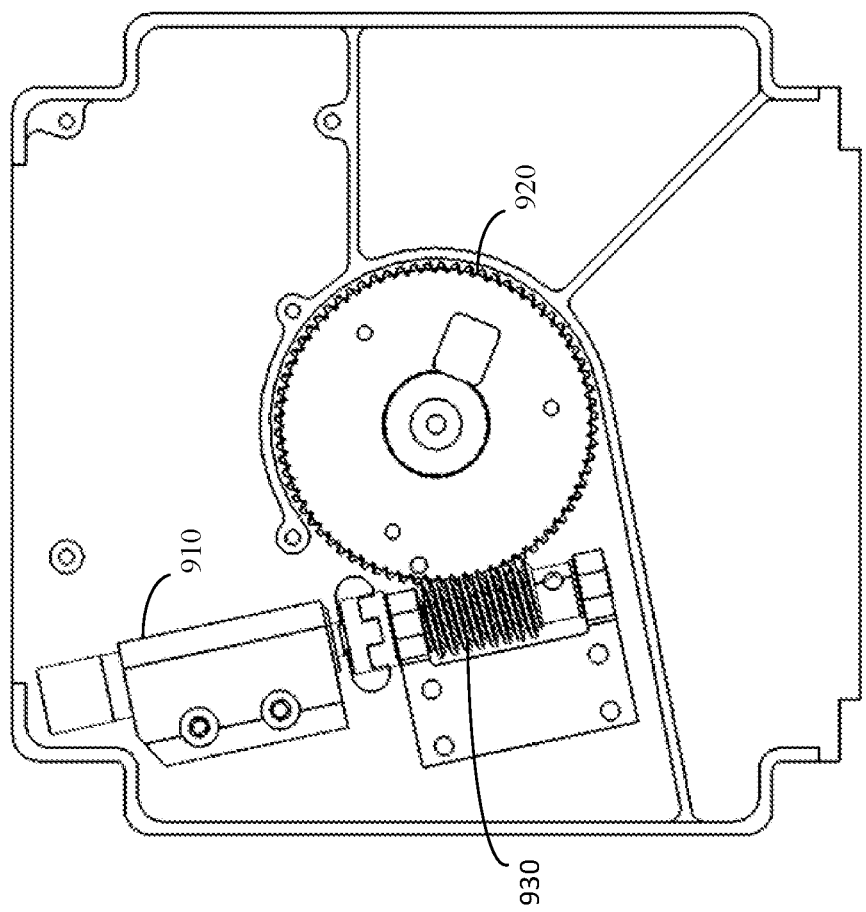

1600

1210

1215

1010

1220

1225

RETROREFLECTOR WITH LOAD-BIASED HINGES

STATEMENT REGARDING FEDERALLY-SPONSORED RESEARCH OR DEVELOPMENT

This invention was made with government support under contract No. FA8802-14-C-0001 awarded by the Department of the Air Force. The government has certain rights in the invention.

FIELD

Various aspects of the disclosure relate to retroreflectors and load-biased hinges, and in one aspect but not by way of limitation, to retroreflectors with load-biased hinges.

BACKGROUND

In general, the average buoyancy of satellites in the thermosphere and the effects of drag on satellites in a lower Earth orbit (LEO) are well understood over a long period of time. This allows accurate orbital predictions to be made for satellites in LEO. However, our understanding of the thermosphere's buoyancy and its immediate drag effects can be limited over short time intervals or in real time—for example, during, or immediately after, a solar event (e.g., solar flares and corona mass ejections (CME)). In an effort to better understand the thermosphere, the National Aeronautics and Space Administration (NASA) has deployed a small number of reflective spheres from a space shuttle to study various characteristics (e.g., density, drag, object buoyancy, etc.) of the thermosphere. These were relatively expensive studies using a very small number of targets (sampling locations). Additionally, due to the orbit of the space shuttle, it can be very difficult to make a responsive mission to study an area of interest in the thermosphere as the release window is very time limited. Accordingly, there is a need for a system and method for measuring various characteristics of the thermosphere on-demand and in an inexpensive manner.

SUMMARY

Disclosed are embodiments of pop-up retroreflectors and load-biased hinges for use with the pop-up retroreflectors. Pop-up retroreflectors can include a focal blade and a plurality of pivotable blades. The focal blade can have a plurality of outer slots. In some embodiments, pop-up retroreflectors can have two outer slots and two pivotable blades. In other embodiments, pop-up retroreflectors can have four outer slots and four pivotable blades. Each of the pivotable blades can be rotated about an outer slot of the focal blade. Pop-up retroreflectors can also include one or more load-biased hinges coupled to the focal blade and to each of the plurality of pivotable blades. The one or more load-biased hinges can rotate the plurality of pivotable blades from a closed position into an opened position when the pop-up retroreflector is released from a dispenser. In some embodiments, each pivotable blade can have two load-biased hinges, one on each side of the pivotable blade. Alternatively, each pivotable blade can have one load-biased hinge.

The focal blade can include a center opening having a first tab extending toward a center of the center opening. The first tab can secure the retroreflector to the dispenser while the first tab is in contact with the dispenser. In some embodiments, the center opening can include a second tab that secures the retroreflector to the dispenser while the second tab is in contact with the dispenser. The second tab can be located opposite from the first tab. In this way, balance can be achieved during the release of the retroreflector.

The focal blade can also include a plurality of anti-interference openings. Each anti-interference opening can be located at an end of each of the plurality of outer slots. The main function of the anti-interference opening is to prevent the intersection between the focal blade and the pivotable blade to interfere with each other's rotation during the deployment process. In some embodiments, each of the plurality of pivotable blades includes a pivoting slot that can receive one of the pluralities of outer slots of the focal blade. Each of the plurality of pivotable blades can also include an anti-interference opening at an end of the pivoting slot.

In some embodiments, the plurality of pivotable blades can include a flange that can stop the plurality of pivotable blades from rotating beyond a certain position (pass the fully deployed position). Each of the plurality of pivotable blades can include a first portion and a second portion, wherein the first and second portions are on different planes. This facilitates the rotation of the pivotable blade. Alternatively, the first and second portions can be on the same plane.

Each load-biased hinge can be a memory wire folded into a W-shaped pattern when the retroreflector is in the closed or undeployed position. In an open or deployed position, the load-biased hinge is memory biased to unfold into a V-shaped pattern. The load-biased hinge can be made of shape memory metal and/or alloy such as nitinol (i.e., a nickel-titanium alloy). Alternatively, the load-biased hinge can be a flat-elastic metal portion. A hinge can be created by folding the flat-elastic metal portion to a folded position. This creates distortion and potential energy to be stored in the flat-elastic metal portion.

The retroreflector can be made with metal or alloy that reflects radio frequency signals. Alternatively, the retroreflector can be made with a very light non-RF reflecting material and can be coated with a RF reflecting material.

In some embodiments, the focal blade can include a plurality of anti-interference openings. Each anti-interference opening is located at an end of each of the plurality of outer slots or at intersections where the edge of the focal blade can come into contact with the edge of a pivotable blade.

Also disclosed is a hinge that includes a wire having a first end, a second end, and a bended portion. The bended portion and the first and second ends form a V-shape pattern when the wire is not deformed. The first and second ends of the hinge can be secured to a surface of the focal plate and the bended portion can be secured to a surface of a pivotable blade. When the wire is deformed, the bended portion is folded toward and between the first and second ends to form a substantially W-shape. The deformation causes the wire to store potential energy in the distorted shape, and once the retroreflector is released from the dispenser, the stored potential energy is released causing the wire to revert to the original V-shape. The wire can be made from a shape memory alloy such as nitinol or any other super elastic material.

Also disclosed is a method for forming a load-biased hinge. The method includes inserting a strand of memory wire into a mold having a V-shape cross section; and heating the mold to at least 300° Celsius to set the memory wire to a V-shape.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

FIGS. 2A-2C illustrate the pop-up retroreflector in different stages of deployment in accordance with an aspect of the disclosure.

FIG. 5D-5F are side views of pivoting blades of the pop-up retroreflector in accordance with some aspects of the disclosure.

FIG. 9 is a bottom view of the retroreflector dispenser in accordance with an aspect of the disclosure.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practical, similar or like reference numbers may be used in the figures to indicate similar or like functionality.

DETAILED DESCRIPTION

Overview

A solar event such as a CME can occur at any time. When a CME happens, it is desirable to have atmospheric sensors/reflectors ready to deploy at a moment notice. In this way, any potential effects on satellites (e.g., orbital decay) in an area of interest in the thermosphere can be immediately determined. Disclosed herein is a system having on-demand deployable retroreflectors, which can be small spherical-shaped metal apparatuses having a size similar to that of a softball. Retroreflectors are passive sensors and can be deployed by CubeSats already positioned within areas of interest in the thermosphere. Once a CME is detected, one or more CubeSats can be instructed to immediately deploy one or more retroreflectors to allow for accurate and real-time measurement of various characteristics of the thermosphere.

A deployable retroreflector can have CubeSat-like dimensions and can have very low mass. A CubeSat can store many retroreflectors (also referred to as passive reflector satellites) and can dispense one or more retroreflectors in accordance with a predetermined schedule or on-command, in response to observed space weather phenomena such as a CME. Using radio waves reflecting back from one or more retroreflectors, orbital decay can be determined for each of the retroreflectors. This allows for a better understanding of the relationship between space weather and the orbit lifetime or orbital decay characteristics of satellites in LEO.

Retroreflectors

Figure 1:
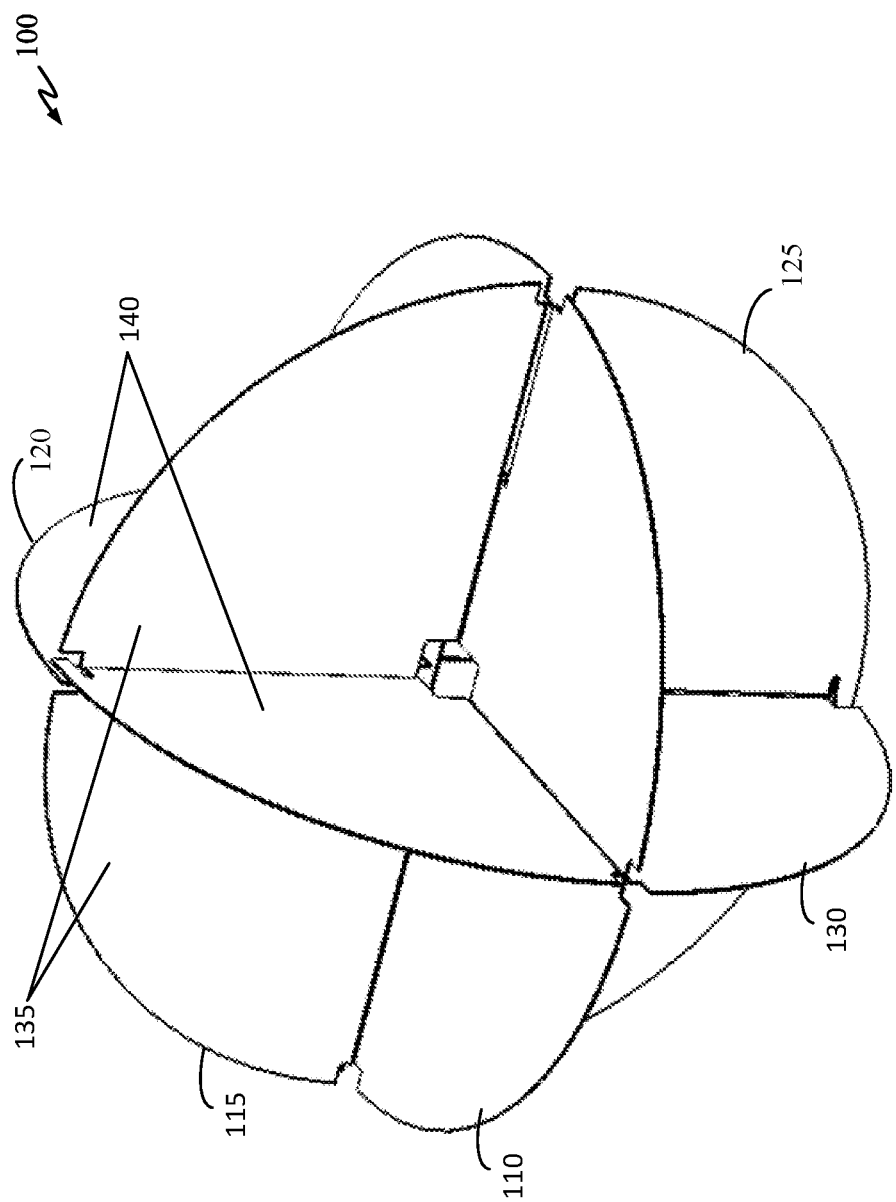
FIG. 1 illustrates a pop-up retroreflector in accordance with an aspect of the disclosure.

FIG. 1 illustrates a retroflector 100 in accordance with some example embodiments of the present disclosure. Retroreflector 100 includes a focal or main blade 110 and four pivoting blades 115, 120, 125, and 130. Main blade 110 is centrally located and is non-pivoting. In other words, each of the four pivoting blades 115, 120, 125, and 130 pivots about main blade 110. Main blade 110 may have a circular shape or other shape such as a trapezoid or a polygon. For example, main blade 110 may be a hexagon or an octagon. Each pivoting blade may have the same shape as main blade 110, but half in size. Stated differently, blades 115 and 125 form a blade-pair 135 with the same shape as main blade 110. Similarly, blades 120 and 130 form a blade-pair 140 with the same shape as main blade 110.

Each blade can be made of metals, metal alloys, or any radio frequency (RF) reflecting materials. For example, each blade can be made of aluminum or steel, which are both strong and lightweight. Alternatively, each blade can be made of a non-metal material, which can be coated with a RF reflecting layer. For example, each blade can be made with a heat resistance plastic with a metal coating. In this way the retroflector can be made very light. In some embodiments, all blades of retroreflector 100 can be made of the same material such as aluminum. Each blade can have a thickness of 0.005 to 0.015 inches. In some embodiments, each blade can have a thickness of 0.010 inches.

Each blade of the retroreflector can have a solid surface. Alternatively, the surface of each blade can have one or more slots or holes such that the weight of the blade is reduced but the structural integrity of the blade is maintained. For example, each blade can be made with a metal mesh having a honeycomb pattern or alike. This allows for retroreflector 100 to be made very light, and at the same time, very strong.

Retroreflector 100 can have a diameter of 5-15 cm, depending upon the deployment vehicle. In one embodiment, retroreflector 100 is sized to fit within a standard CubeSat's dimension, which is 10 cm on each side. In this embodiment, retroreflector 100 can have a diameter between 5-9 cm. It should be noted that values and ranges of values are provided herein serve merely as examples and that no claim based on this disclosure is to be interpreted as limited to a particular value or range of values absent explicit recitation of that value or range of values in the claim.

Retroreflector 100 can have two states, undeployed (closed) and deployed (opened). In an undeployed state, retroreflector 100 can have a very low profile as each of the pivoting blades is folded flat to a substantially a parallel position with respect to main blade 110. In some embodiments, in an undeployed state, retroreflector 100 can have a flat shape similar to that of a pancake, but with a much thinner profile. In some embodiments, retroreflector 100 can have a profile of approximately 1 mm in an undeployed state. In a deployed (pop-up) state, each of the pivoting blades (115, 120, 125, and 130) is substantially perpendicular to main blade 110. Each pivoting blade can be biased to pivot/swing about an axis on the surface of main blade 110 such that each pivoting blade will move from a substantially parallel position (with respect to the surface of main blade 110) to a substantially perpendicular position. In some embodiments, each blade can be biased to move from a parallel to a perpendicular position using shape memory alloy (SMA) or metal wires, SMA wire hinges, spring hinges, flat tension springs, or the like. In one embodiment, each pivoting blade can have two SMA wire hinges coupling the pivot blade to main blade 110. More discussion of SMA wire hinges is provided below.

FIGS. 2A-2C illustrate retroreflector 100 in various deployment positions in accordance with some embodiments of the present disclosure. As shown in FIG. 2A, retroflector 100 is in a fully undeployed state. In this state, all of the pivoting blades are substantially parallel to main blade 110, giving retroreflector 100 a very low profile. As shown in FIG. 2B, retroreflector 100 is in a transition period between an undeployed to deployed state or vice versa. As previously mentioned, the transition process from an undeployed to a deployed state can be encouraged using SMA wire hinges that are biased to push each pivoting blade to the deployed position.

FIG. 2C illustrates retroreflector 100 in a fully deployed state where all pivoting blades are substantially perpendicular to main blade 110. In some embodiments, each of the blades is circular in shape. In this embodiment, the main and perpendicular pivoting blades also form eight cavities, each of which has a shape similar to a quarter section of a sphere. The surface of each cavity can be metal or can be coated with a RF reflecting material. Once deployed, the RF reflecting cavities can reflect back RF signals in the general direction of the RF signals source. This allows ground stations to detect any changes in the orbit of retroreflector 100 by monitoring the reflected RF signals.

Figure 3:
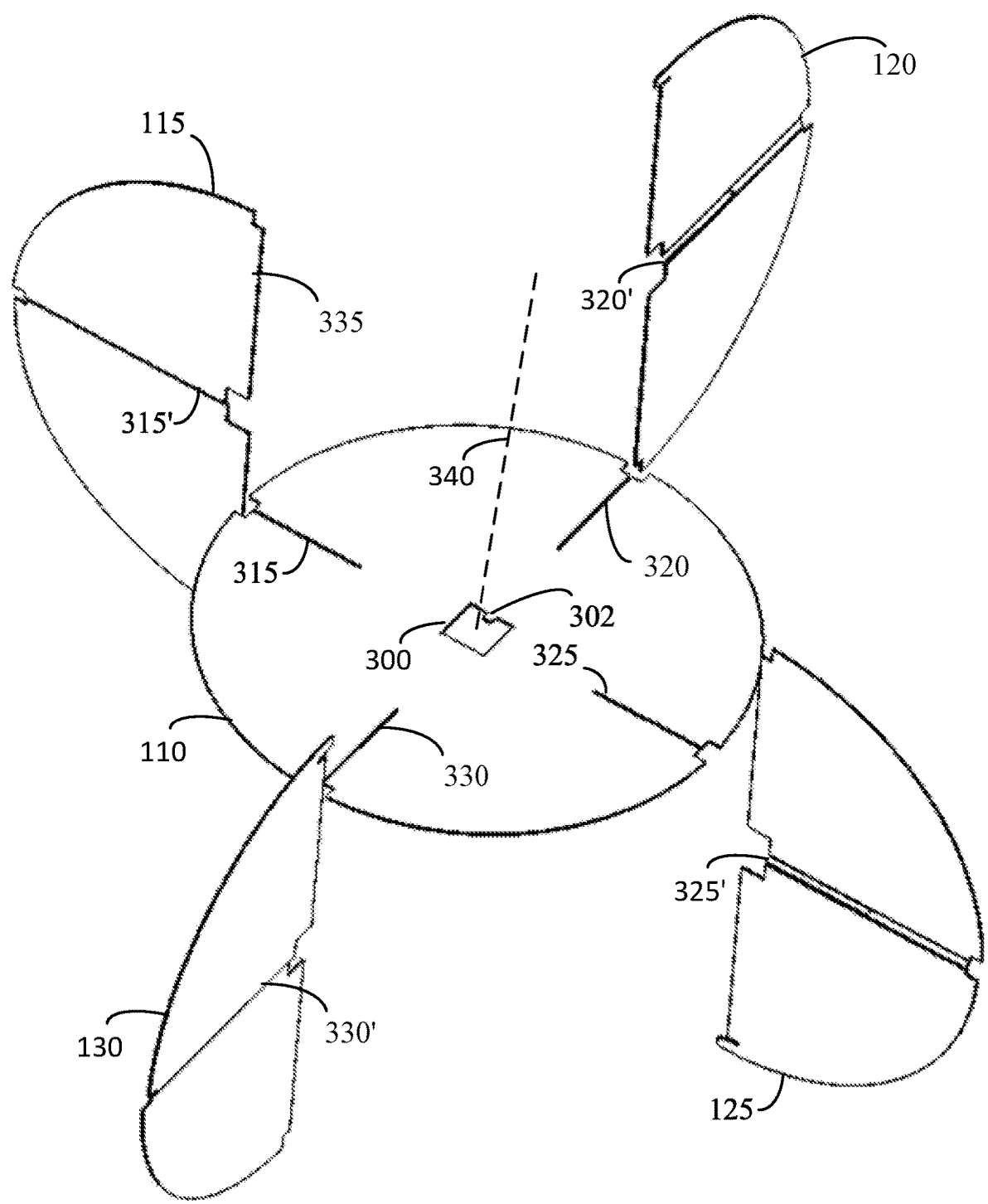
FIG. 3 is an exploded view of the pop-up retroreflector in accordance with an aspect of the disclosure.

FIG. 3 illustrates an exploded view of retroreflector 100. In some embodiments, each of the pivoting blades (115, 120, 125, and 130) can have a shape of a half circle. Alternatively, each pivoting blade can have other shape such as half a hexagon or an octagon, for example. As shown, main blade 110 includes a center slot 300, which is used to receive a support column (not shown) of a dispenser (also not shown). Center slot 300 can be a square, a circle, a triangle, a rectangle, or any other shape suitable for receiving a post or column for holding or securing retroreflector 100 in position. Center slot 300 can include one or more tabs along the perimeter of center slot 300. In some embodiments, center slot 300 has a single tab 302, which provides a surface for a dispenser column (not shown) to grab and secure retroreflector 100 before it can be released.

As depicted in FIG. 3, main blade 110 includes four elongated slots 315, 320, 325, and 330 for receiving pivoting blades 115, 120, 125, and 130, respectively. Each of the four slots 315, 320, 325, and 330 extend from an outer region toward the center of main blade 110. Each pivoting blade also includes a pivoting slot to receive the corresponding slot on main blade 110. For example, each of pivoting blades 115, 120, 125, and 130 includes a pivoting slot 115', 120', 125', and 130'. The length of each slot is determined by the overall diameter of retroreflector 100. For example, the length of slot pair 315-315' is selected such that an edge 335 of pivoting blade 115 will be substantially on or near a center axis 340 of main blade 110. Similarly, the length of slot pairs 320-320', 325-325', and 330-330' are selected such that their respective innermost edge will be substantially on or near center axis 340.

In some embodiments, the length of slots 315 and 315' are selected such that edge 335 would stop short of center axis 340. For example, the length of slots 315 and 315 can have a length such that when the slots 315 and 315' are mated (inserted into one another), edge 335 is at least 2 mm from center axis 340. In this way, when retroreflector 100 is in a fully deployed state (see FIG. 2C), pivoting blade 115 does not interfere with the opposing blade 125 or any of the adjacent blades 120 and 130.

In some embodiments, retroreflector 100 can have three pivoting blades 115, 120, and 125, each blade at equal distance apart (e.g., 60 degrees separation) instead of four pivoting blades. In this embodiment, retroreflector 100 also has three slots (315, 320, and 325) instead of four slots. In some embodiments, retroreflector 100 can also have only 2 pivoting blades.

Figure 4:
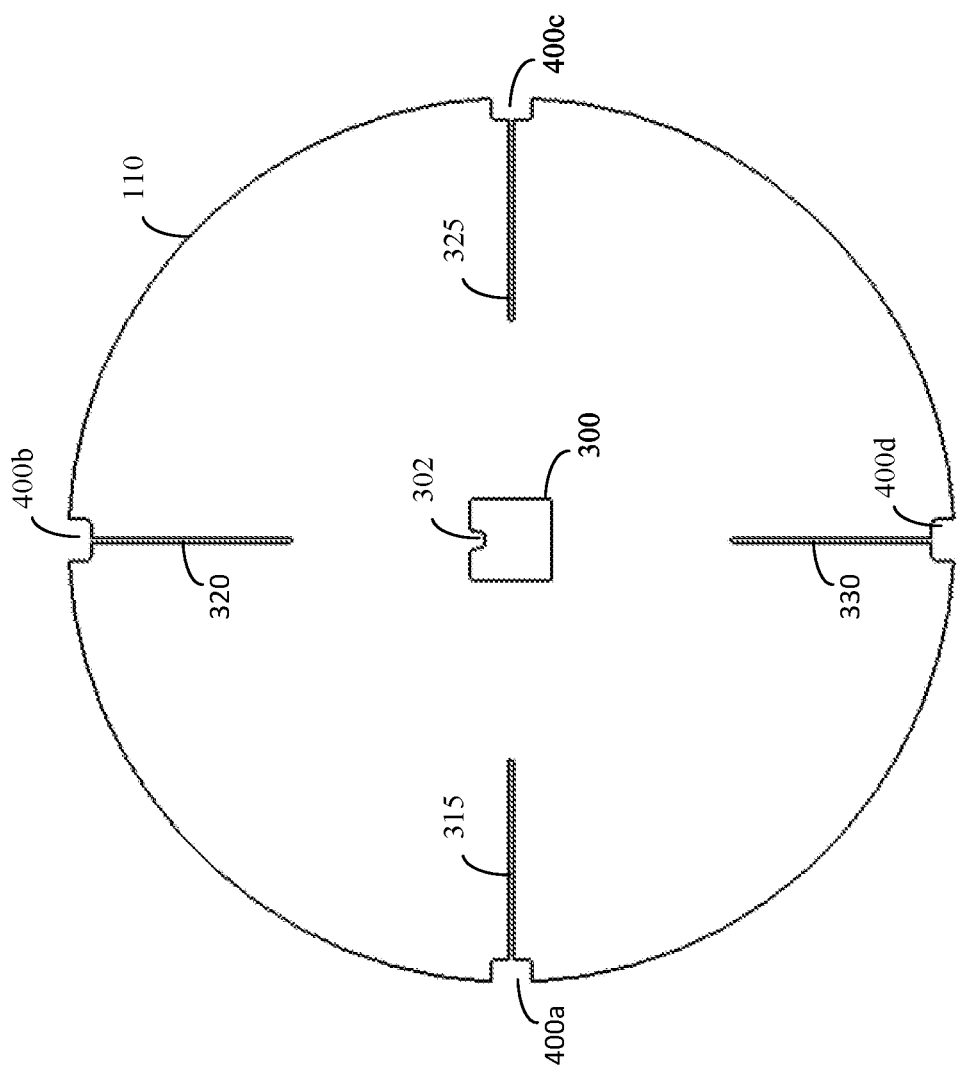
FIG. 4 illustrates a focal blade of the pop-up retroreflector in accordance with an aspect of the disclosure.

FIG. 4 is a top view of main plate 110 in accordance with some embodiments of the present disclosure. Main plate 110 includes four anti-interference openings 400a, 400b, 400c, and 400d. Each anti-interference opening allows a corresponding pivoting blade to rotate freely without substantial interference it would have otherwise experienced without the opening. Opening 400a is located at the beginning of slot 315, opening 400b is located at the beginning of slot 320, and openings 400c-d are located at the beginning of slots 325 and 330, respectively. Each anti-interference opening can be a square, a circle, a half circle, a rectangle, a trapezoid or the like. The size of the anti-interference opening is not critical as long as it is larger than the thickness of the pivoting blade (e.g., blades 115). In some embodiments, the width of the anti-interference opening is at least 3 times larger than the thickness of the pivoting blade. In this way, the pivoting blade can have room to wiggle as it moves from an undeployed state to a deployed state.

As previously mentioned, tab 302 provides a surface for a dispenser (to be discussed below) to secure retroflector 100 in place before deployment. In some embodiments, main blade 110 can have two or more tabs 302. In the embodiment with two tabs, each tab is directly opposite of each other. In this way, during the release of retroflector 100 from the dispenser, retroreflector 100 can be substantially parallel to its original position upon release.

Figure 5B:
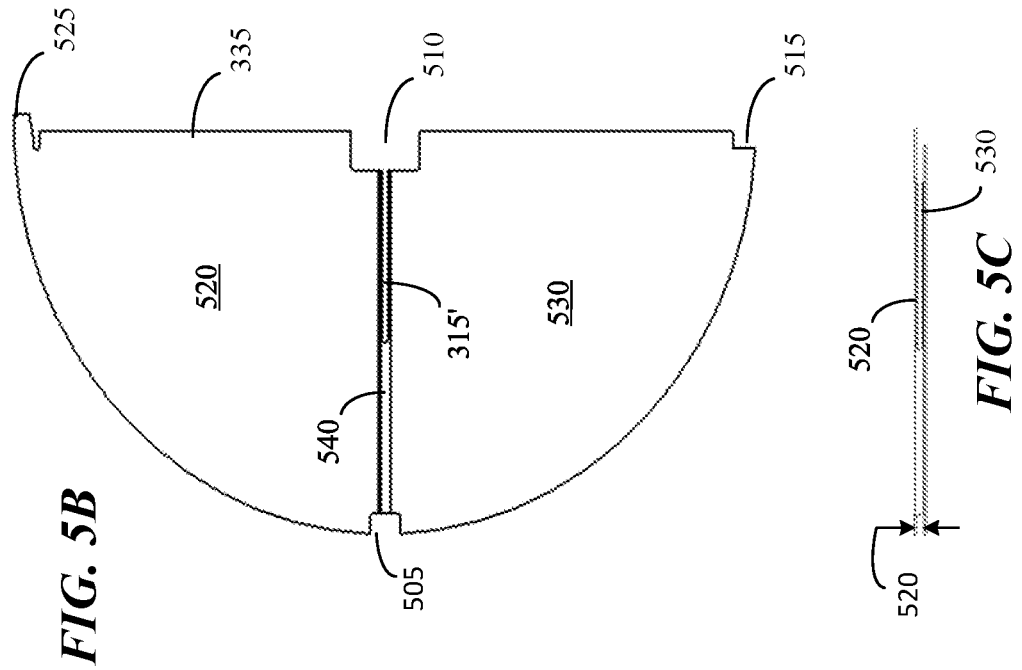
FIG. 5B is a top view of the pivoting blade of the pop-up retroreflector in accordance with an aspect of the disclosure.
Figure 5C:
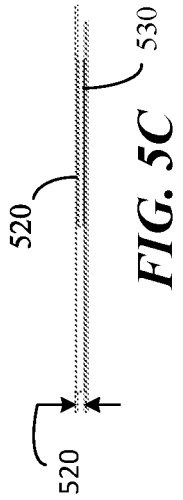
FIG. 5C is a side view of the pivoting blade of the pop-up retroreflector in accordance with an aspect of the disclosure.
Figure 5A:
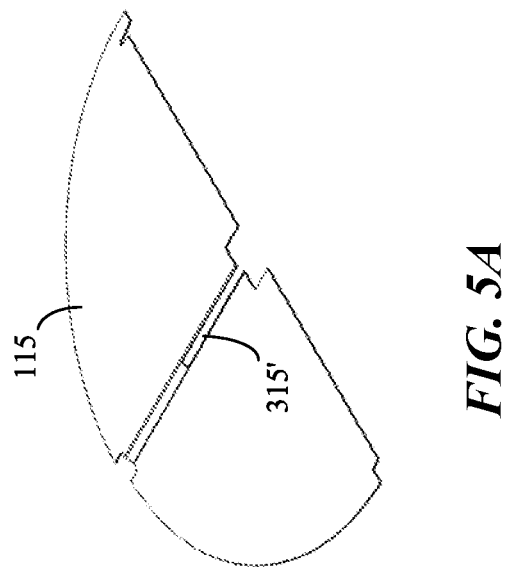
FIG. 5A is a perspective view of a pivoting blade of the pop-up retroreflector in accordance with an aspect of the disclosure.

FIGS. 5A-5F illustrate various views of pivoting blade 115 in accordance with some embodiments of the present disclosure. FIG. 5A is a perspective view of pivoting blade 115. FIG. 5B is a top view of pivoting blade 115, and FIG. 5C is a side view of pivoting blade 115. Pivoting blade 115 can include one or more anti-interference openings. In some embodiments, pivoting blade 115 includes three anti-interference openings 505, 510, and 515, one opening at each contact point (contact with another pivoting blade or main blade can occur). Similar to anti-interference opening 400, each of the anti-interference openings of pivoting blade 115 is to reduce or eliminate the chance of interference between main blade 110 and pivot blade 115 during the deployment (unfolding) process. Each of the anti-interference openings can exhibit a wide range of shapes such as a circle, a half circle, a rectangle, a square, a triangle, etc., as long as the width of the opening is sufficient large to provide for some wiggle room between blades 110 and 115.

FIG. 5D illustrates pivoting blade 115 with a larger anti-interference opening 555. As shown, opening 555 clips an entire bottom portion of pivoting blade 115. In FIG. 5E, opening 560 is situated such that it clips an entire side portion of pivoting blade 115. In FIG. 5F, opening 505 has a triangular shape rather than a rectangular shape as shown in FIG. 5B.

Figure 6:
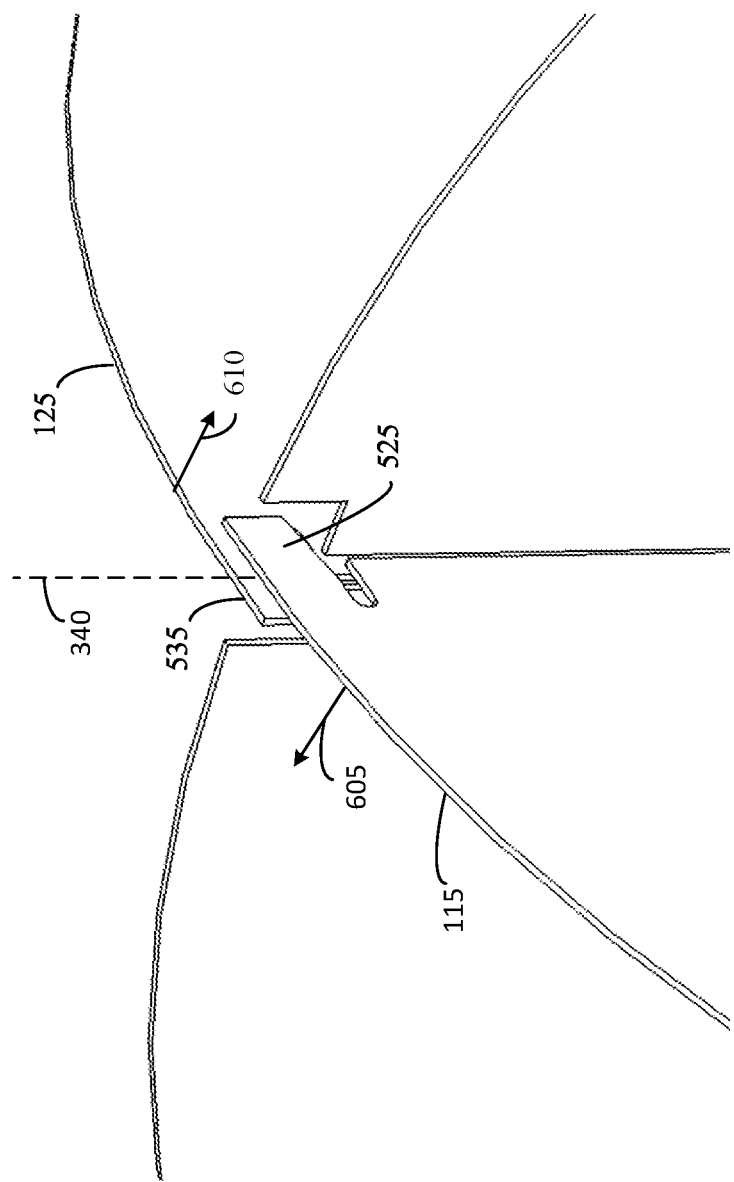
FIG. 6 is a close-up view of a portion of the pop-up retroreflector in a fully deployed position in accordance with an aspect of the disclosure.

FIG. 6 illustrates a clipped pivoting blade 115 in accordance with some embodiments of the present disclosure. As shown in FIG. 6, pivoting blade 115 can include anti-interference opening 515 that extends the entire portion of blade 115 such that blade 115 is clipped. This enables pivoting blade 115 to pivot freely while substantially reducing the chance of an interference that can be caused an unclipped pivoting blade.

Pivoting blade 115 can include two portions: a first portion 520 and a second portion 530. Portions 520 and 530 can be on a same or a different plane. In some embodiments, portion 520 and 530 are on a different plane, separated by a bridge portion 540. Portions 520 and 530 of pivoting blade 115 can have a separation distance 520. In some embodiments, separation distance 520 can have a range of 2-10 mm. The separation between portions 520 and 530 facilitate the rotation of pivoting blade 115 about slot 315 of main blade 110 (see FIG. 3).

In some embodiments, pivoting blade 115 includes a stop flange 525 that extends beyond edge 335, which is the main edge facing the center of retroreflector 100. Stop flange 525 is sized to extend beyond center axis 340 (see FIG. 3). In this way, stop flange 525 of pivoting blade 115 can serve as a stop as it makes contact with a corresponding stop flange on pivoting blade 125, which is located on the opposite end of retroreflector 100. FIG. 6 is illustrative of this feature.

FIG. 6 illustrates a close-up view of a portion of retroreflector 100 in a deployed state. During the deployment stage of retroreflector 100, pivoting blade 115 is rotating in a direction indicated by arrow 605, and pivoting blade 125 is rotating in the direction indicated by arrow 610. Both pivoting blades 115 and 125 are biased to rotate in their respective direction, using load-biased hinges (e.g., SMA wire hinges), until stop flanges 525 and 535 come into contact with one another. Similar to stop flange 525, stop flange 535 also extends beyond center axis 340. In this way, flanges 525 and 535 will stop each respective pivoting blades 115 and 125 from over rotating and to achieve rotational equilibrium at, or substantially near, center axis 340. In some embodiments, each pivoting blade (e.g., 115, 120, 125, and 130) can have one stop flange at one of the corners near center axis 340. Alternatively, each pivoting blade can have two stop flanges, one at each corner or end of the pivoting blade. Stop flanges 525 and 535 may exhibit a square shape, a rectangular shape, or any other protruding shapes.

In some embodiments, each pivoting blade contains one or more load-biased hinges with the same spring constant. This allows each pivoting blade to rotate at a similar rate and force, and thereby resulting in, each blade coming to rest at or substantially near center axis 340 at substantially the same time. Additional discussion of load-biased hinges is provided below. Although FIGS. 5A-5C only illustrate pivoting blade 115, it should be noted that pivoting blades 120, 125, and 130 can have one or more similar or identical features as the features described with respect to pivoting blade 115.

Figure 7:
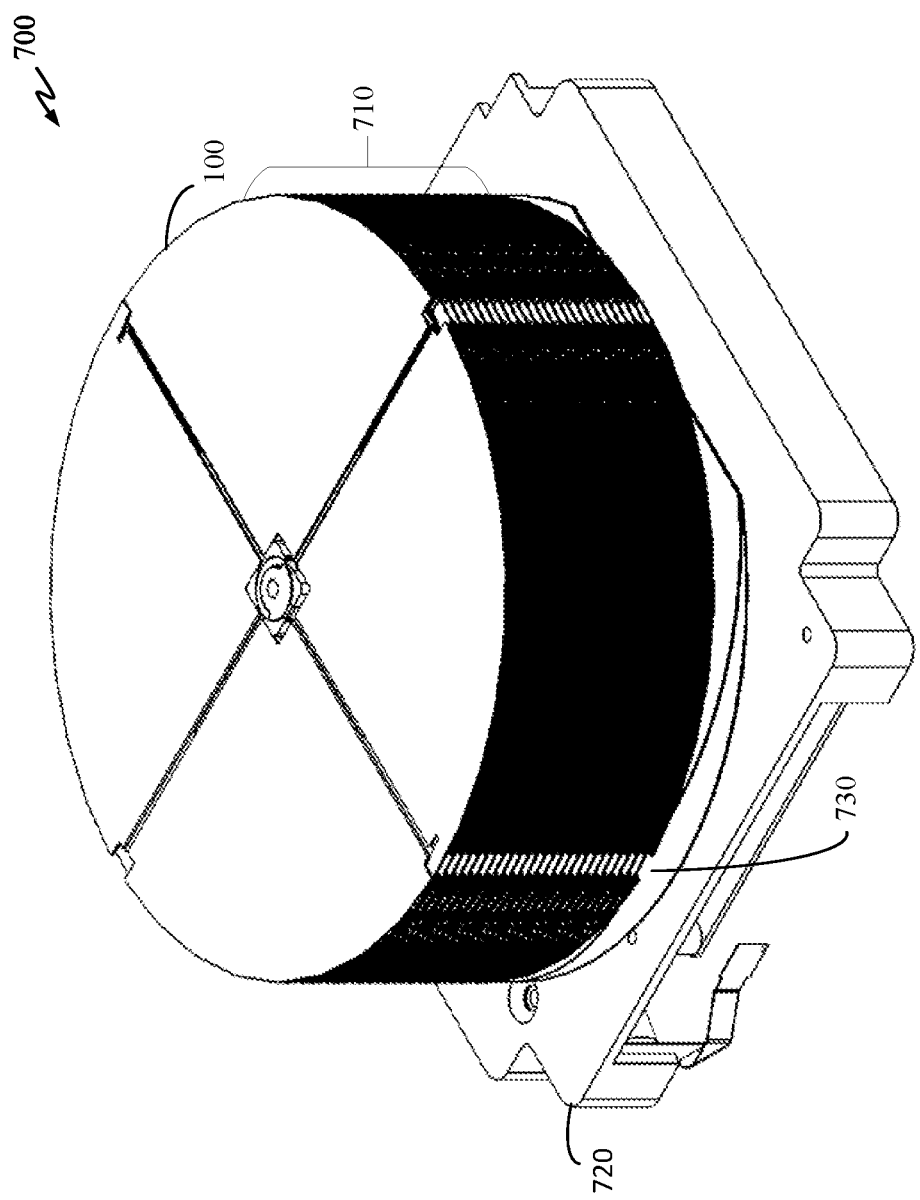
FIG. 7 illustrates a retroreflector assembly in accordance with an aspect of the disclosure.

FIG. 7 illustrates a perspective view of a retroreflector dispenser assembly 700 which includes a stack of retroreflectors 710, a dispenser 720, and optionally a retroreflector stack stabilizer 730 in accordance with some embodiments of the present disclosure. In some embodiments, dispenser assembly 700 can be appropriately dimensioned to fit on a CubeSat, as part of the cargo compartment of a CubeSat. Dispenser assembly 700 can hold 20 or more retroreflectors 100. In some embodiments, stack of retroreflectors 710 can have 28 retroreflectors 100 on top of stack stabilizer 730.

Stack stabilizer 730 is spring biased to push the stack of retroreflectors 710 upward along the radial direction of center axis 340 (see FIG. 3) while maintaining the stack of retroreflectors 100 parallel to the base of dispenser 720. In this way, when dispenser 720 dispenses the top most retroreflector of the stack, the dispensed retroreflector can be released at substantially parallel to the stack and/or the base of dispenser 720. This enables a CubeSat to have better control over the release angle and trajectory of retroreflector 100. Further, a controlled parallel release of retroreflector 100 can prevent any erratic spin, which may lessen the strength of the reflected RF signals.

Figure 8:
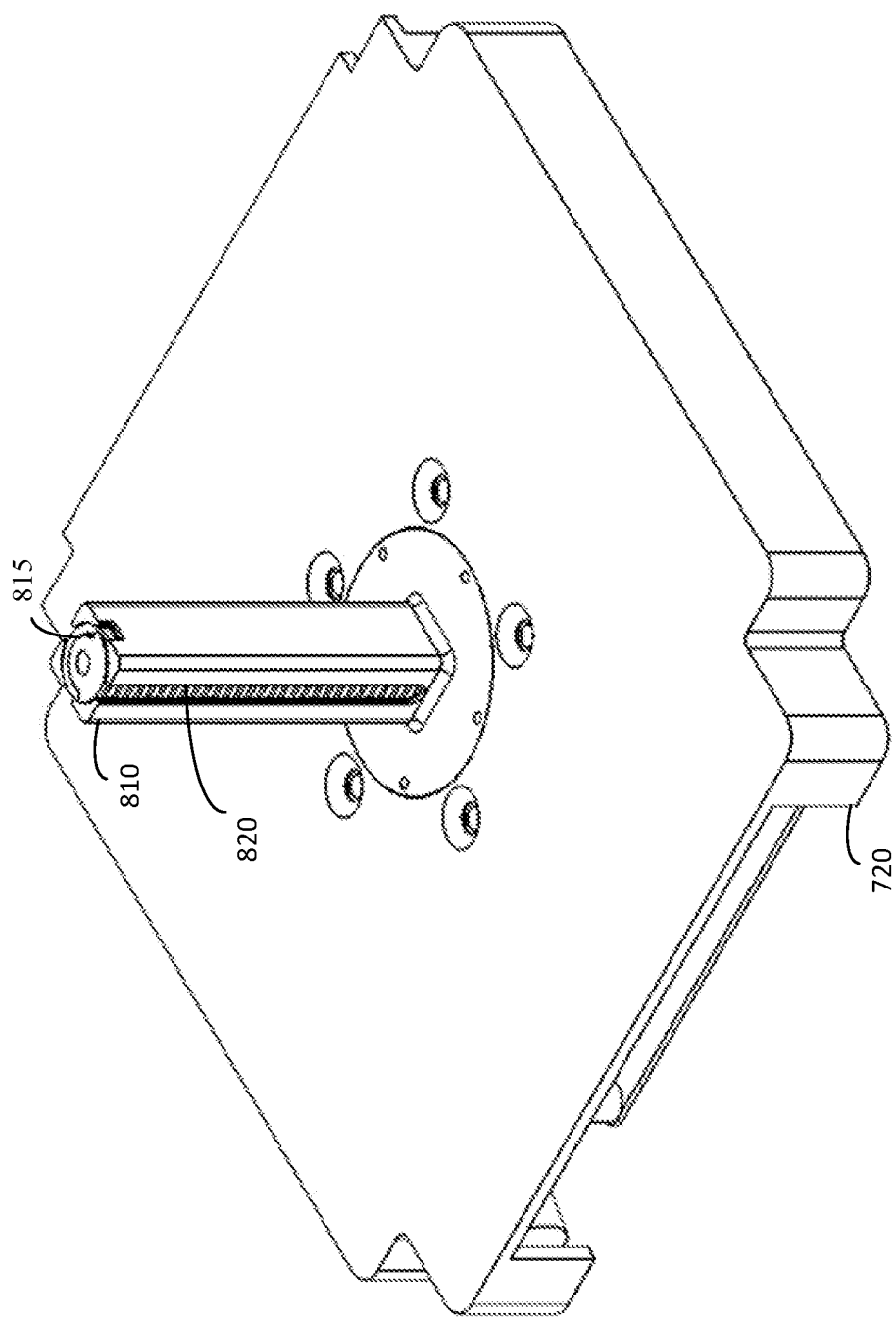
FIG. 8 illustrates a retroreflector dispenser in accordance with an aspect of the disclosure.

FIG. 8 illustrates a perspective view of dispenser 720 in accordance with some embodiments of the present disclosure. To facilitate the discussion of dispenser 720 and its functionalities, please refer to both FIGS. 3 and 8. Dispenser 720 includes a support or dispensing column 810, an auger 815, and a slit 820. Dispensing column 810 can have the same general shape as center opening or slot 300 (see FIG. 3) and can be sized appropriately such that it could be inserted into center slot 300 while allowing retroreflector 100 to freely move in the radial direction, but at the same time does not give retroreflector 100 a lot of room to wiggle in non-axial directions. Dispensing column 810 may include one or more slots 820 to receive one or more tabs 302. In some embodiments, dispensing column 810 has one slot 820, which allows tab 302 of retroreflector 100 to be radially secured by auger 815. In some embodiments, the number of slots 820 is equal to the number of tabs 302 on retroreflector 100. For example, dispensing column 810 can have four slots 820, one on each side of column 810. In this example, main blade 110 can have four corresponding tabs 320, one for each slot 820. Each of the four tabs 302 can be slowly advanced by auger 815 until all four tabs 302 are free, which then results in retroreflector 100 being released.

In some embodiments, auger 815 can have a screw-like structure with a helical pattern made to slowly advance tab 302 until tab 302 is free from auger 815. FIGS. 8 and 9 will now be discussed concurrently. FIG. 9 illustrates a bottom view of dispenser 720 in accordance with some embodiments of the present disclosure. Auger 815 can be turned using a small electric motor 910, which is coupled to auger 815 by gears 920 and 930. Alternatively, electric motor 910 can be directly coupled to the shaft of auger 815, where space is not an issue.

Low Profile Hinges

Referring now to FIG. 3, as previously mentioned, each blade can be biased to rotate about a slot on main plate 110 using a load-biased hinge, which can be made with shape memory alloy (SMA) or metal wires, coil springs, elastic metals, or the like. For example, a load-biased hinge can be a flat and elastic metal portion folded substantially in half. When folded in half, the metal portion builds up potential energy through its elasticity. This creates a load-biased hinge as the metal portion naturally wants to spring back to the unfolded position. The metal portion can be any metal with a high modulus of elasticity (greater than 200 GPa) such as steel, steel alloys, nickel, copper alloys, etc. For example, the load-biased hinge can be made with nickel 200 or a nickel-cobalt alloy (e.g., Kovar™, a trademark of CRS Holdings, Inc.), which have a modulus of elasticity of 204 and 207 GPa, respectively.

In some embodiments, a load-biased hinge can be made from SMA metal wires such as nitinol wires. SMA wire hinges are desirable in applications where the form factor is important—SMA wire hinges are only as thick as the diameter of the SMA wire when in the collapsed (undeployed) state. SMA wire hinges can be made to remember a default shape by setting the SMA wires to a desired shape using high temperature. When deformed, a SMA wire hinge naturally wants to revert to its default shape, thereby creating a load-biased hinge. In some embodiments, each blade can have one or more SMA wire hinges to force the blade to rotate about a slot of main plate 110. For example, blade 115 can be biased to rotate about slot 315 and blade 120 can be biased to rotate about slot 320. Each pivoting blade can have one or more SMA wire hinges coupled to one or more of portions (e.g. portions 520 and 530 of FIG. 5B) of a pivoting blade (e.g., blades 115, 120, 125, and 130). In some embodiments, SMA wire hinges are coupled on opposite sides of a blade in order to achieve the same direction of rotation.

Figure 10A:
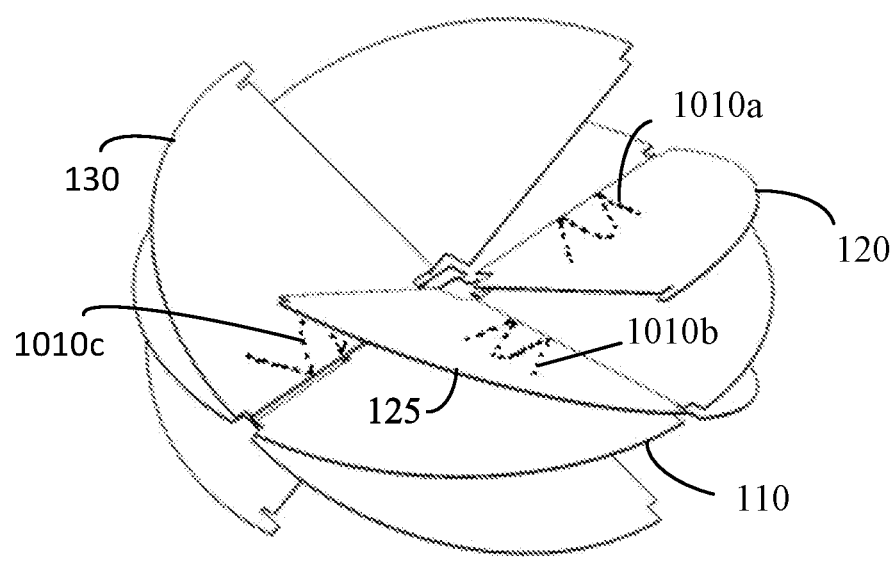
FIGS. 10A-10C illustrate various locations of load-biased hinges on a retroreflector in accordance with an aspect of the disclosure.
Figure 10B:
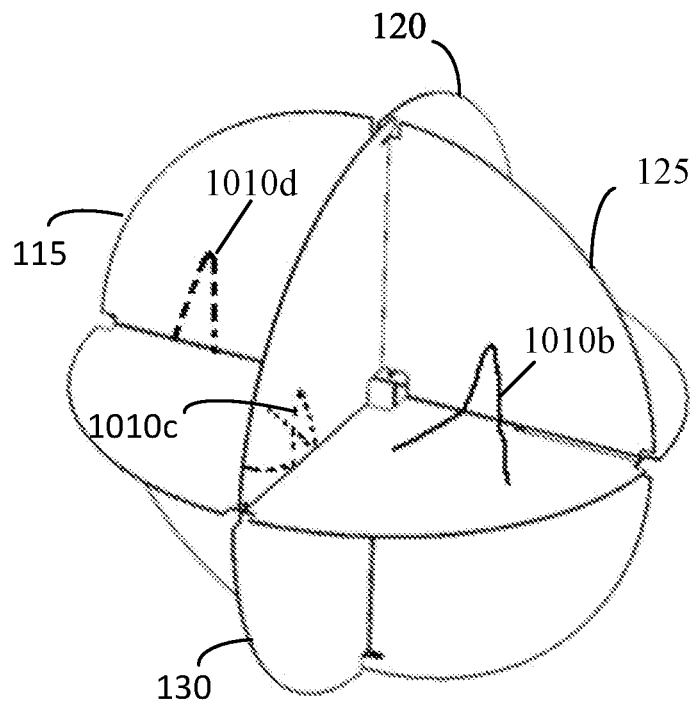

FIGS. 10A-B are perspective views of retroreflector 100 with SMA wire hinges 1010 attached thereon. SMA wire hinges 1010 can be attached to retroreflector 100 using adhesive, solder, tape, or any other suitable form of attachment mechanism having a very low profile—same or less profile as the SMA wire hinges. FIG. 10A illustrates the positions of SMA wire hinges 1010a, 1010b, and 1010c behind blades 120, 125, and 130, respectively, while retroreflector 100 is unfolding from an undeployed (flat) position. It should be noted that SMA wire hinges in FIG. 10A are shown in dashed lines because they are hidden from view and not all SMA wire hinges on retroreflector 100 are shown. FIG. 10B illustrates the positions of SMA wire hinges 1010b, 1010c, and 1010d of pivoting blades 125, 130, and 115, respectively, when retroreflector 100 is in a fully deployed position.

Figure 10C:
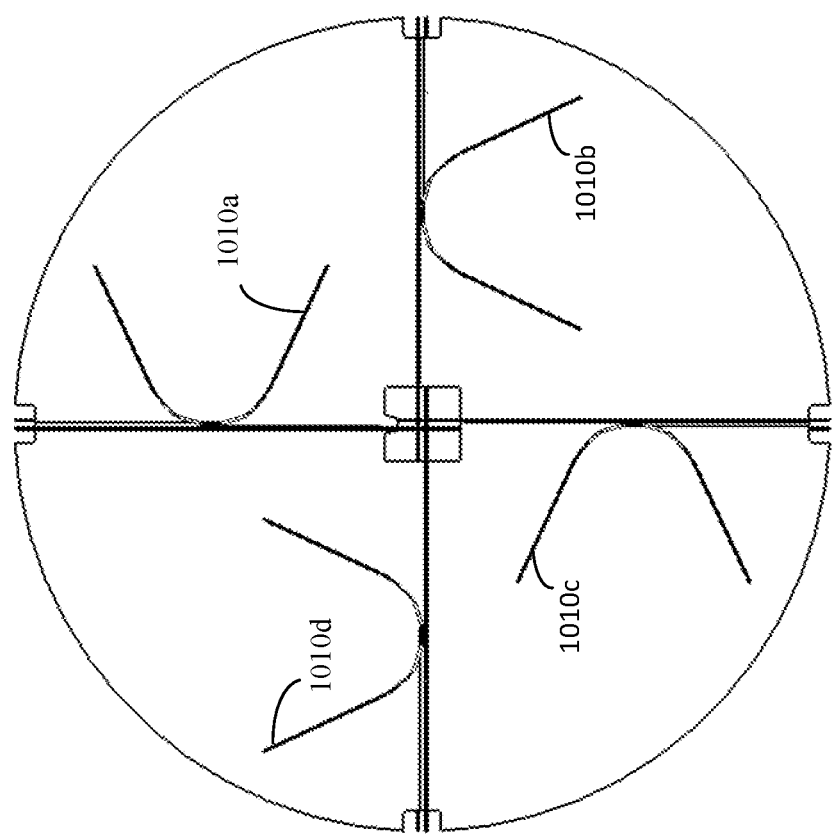

FIG. 10C is a top view of retroreflector 100, FIG. 10C illustrates the locations of SMA wire hinges 1010a, 1010b, 1010c, and 1010d. In some embodiments, retroreflector 100 can have four SMA wire hinges. In this embodiment, each pivoting blade can only have one SMA wire hinge as shown in FIG. 10C.

Figure 11:
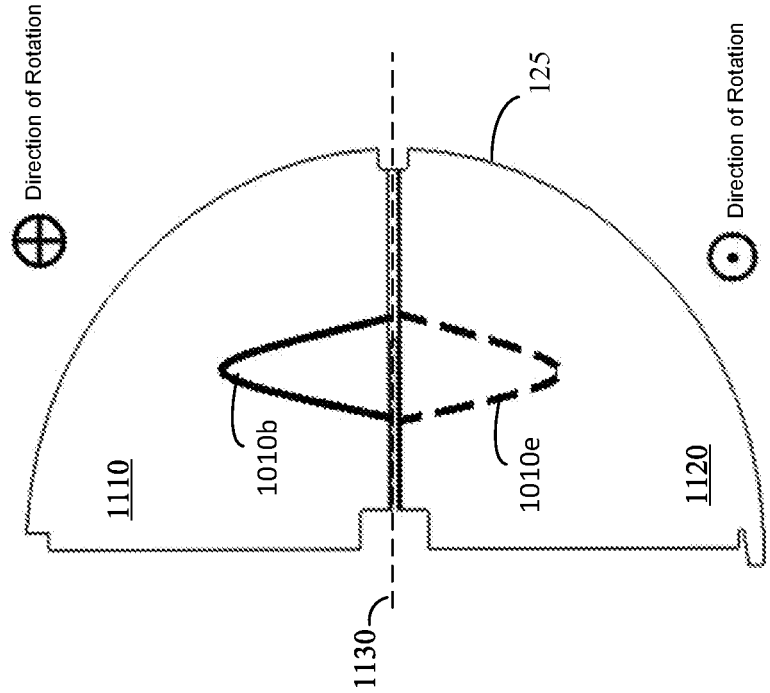
FIG. 11 illustrates the locations of load-biased hinges on a pivoting blade in accordance with an aspect of the disclosure.

In some embodiments, each pivoting blade can have two SMA wire hinges 1010 coupling the pivoting blade to main blade 110, one SMA wire hinge on each portion of the pivoting blade (each blade has two portions). For example, portions 520 and 530 of FIG. 5B can each have a SMA wire hinge. FIG. 11 is illustrative of this feature. FIG. 11 is a side view of pivoting blade 125 having two SMA wire hinges in accordance with some embodiments of the present disclosure. As shown, blade 125 includes portions 1110 and 1120 (which are similar to portions 520 and 530 of pivoting blade 115). Portion 1110 includes a top portion of SMA wire hinge 1010b attached to the surface facing out of the page (toward the viewer). The bottom portion of SMA wire hinge 1010b is attached to a top surface of main blade 110 (see FIG. 10B). Portion 1120 includes a top portion SMA wire hinge 1010e on the opposite side of pivoting blade 125. The bottom portion of SMA wire hinge 1010e is attached to a bottom surface of main blade 1010 (not shown). SMA wire hinge 1010e is shown with dotted lines as it is located at a back surface of portion 1120. SMA wire hinges are attached to opposing sides of a pivoting blade in order to bias the pivoting blade to rotate in one direction. For example, SMA wire hinges 1010b and 1010e are positioned to rotate blade 125 in the same direction of rotation about axis 1130.

Referring again to FIG. 10A, in a compressed state, a SMA wire hinge can have a "W" shape as the top portion of the SMA wire hinge is folded toward the plane of the bottom portion of the SMA wire hinge. For example, when retroreflector 100 is in an undeployed position, pivoting blade 125 is substantially parallel to main blade 110. In this position, the top portion of SMA wire hinge 1010b is folded toward the bottom portion of SMA wire hinge 1010b. This forces SMA wire hinge 1010b to have a "W" like shape and to have potential energy stored (load-biased). Once retroreflector 100 is released from the dispenser assembly 700 (see FIG. 7), the stored potential energy of SMA wire hinge 1010b causes it to straighten out into a "V" like shape, which thereby causes pivoting blade 125 to rotate about main blade 110. Without a stop flange (e.g., stop flange 525 of FIG. 5), pivoting blade 125 may rotate up to 180 degrees until SMA wire hinge 1010b is substantially in a steady state or default state, which is substantially an unfolded "V" shape. However, because each pivoting blade includes one or more stop flanges, retroreflector 100 can achieve a steady state with a ball like shape as shown in FIG. 12B.

Figure 12A:
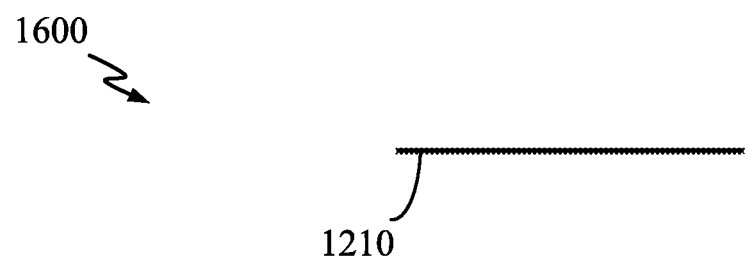
FIGS. 12A-12C illustrate a process for manufacturing a load-biased hinge in accordance with an aspect of the disclosure.
Figure 12B:
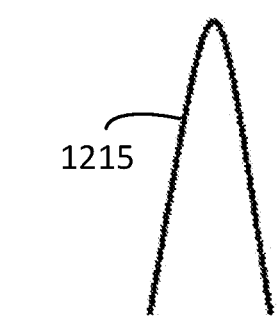
Figure 12C:
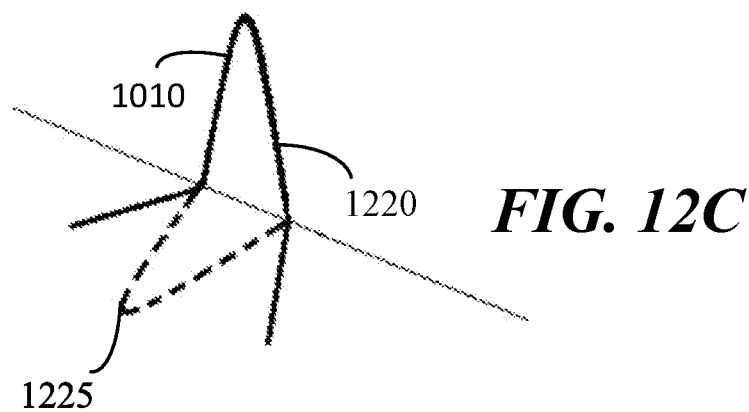

FIGS. 12A-C illustrate a process 1200 how SMA wire hinge 1010 is created. Process 1200 includes taking a stock SMA wire 1210, which is typically straight. Stock SMA wire 1210 can be a nitinol memory wire or other type of memory alloy wire. Once stock SMA wire 1210 is cut to length, it is inserted into a cavity of a mold (not shown), which can have a substantially V shape. The mold and stock wire 1210 is then heated to a temperature that sets SMA wire 1210 to take the shape of the mold. The mold can be heated using a hot air gun. After the heating stage, SMA wire 1210 is transformed into a V-shaped SMA wire 1215.

A hinge can be created from the V-shaped SMA wire 1215 by securing each of the legs (or ends) of wire 1215 and then bending the top portion of wire 1215 to position 1220 or 1225 as shown in FIG. 12C. Once at position 1220 or 1225, the memory effect of SMA wire 1215 forces it back to a straight position as shown in FIG. 12B. In this way, SMA wire hinge 1010 is created. Unlike other hinges, SMA wire hinge 1010 has a very low height profile, which is the same as the thickness of SMA wire 1210. Other hinges are coil or torsional hinges, which have a coil diameter larger than the thickness or diameter of the hinges' material.

The foregoing description of the embodiments of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof.

Where a discrete value or range of values is set forth, it is noted that that value or range of values may be claimed more broadly than as a discrete number or range of numbers, unless indicated otherwise. For example, each value or range of values provided herein may be claimed as an approximation and this paragraph serves as antecedent basis and written support for the introduction of claims, at any time, that recite each such value or range of values as "approximately" that value, "approximately" that range of values, "about" that value, and/or "about" that range of values.

Conversely, if a value or range of values is stated as an approximation or generalization, e.g., approximately X or about X, then that value or range of values can be claimed discretely without using such a broadening term. Those of skill in the art will readily understand the scope of those terms of approximation. Alternatively, each value set forth herein may be claimed as that value plus or minus 5%, and each lower limit of a range of values provided herein may be claimed as the lower limit of that range minus 5%, and each upper limit of a range of values provided herein may be claimed as the upper limit of that range plus 5%, and this paragraph serves as antecedent basis and written support for the introduction of claims, at any time, that recite those percentile variations.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

In many instances, entities are described herein as being coupled to other entities. It should be understood that the terms "coupled" and "connected" (or any of their forms) are used interchangeably herein and, in both cases, are generic to the direct coupling of two entities (without any non-negligible intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

Additionally, as used herein and in the appended claims, the singular forms "a," "an," and "the" include plural referents unless the context clearly dictates otherwise.

The invention claimed is:

1. A pop-up retroreflector comprising:
   a focal blade having a plurality of outer slots;
   a plurality of pivotable blades configured to rotate about the plurality of outer slots of the focal blade; and
   one or more load-biased hinges coupled to the focal blade and to each of the plurality of pivotable blades, wherein the one or more load-biased hinges are configured to rotate the plurality of pivotable blades from a closed position into an opened position when the pop-up retroreflector is released from a dispenser, wherein the focal blade further comprises a center opening having a first tab extending toward a center of the center opening, wherein the first tab is configured to secure the retroreflector to the dispenser while the first tab is in contact with the dispenser.

2. The pop-up retroreflector of claim 1, wherein the center opening comprises a second tab configured to secure the retroreflector to the dispenser while the second tab is in contact with the dispenser.

3. The pop-up retroreflector of claim 1, wherein the focal blade comprises a plurality of anti-interference openings, each anti-interference opening is located at an end of each of the plurality of outer slots.

4. The pop-up retroreflector of claim 1, wherein each of the plurality of pivotable blades comprises a pivoting slot configured to receive one of the plurality of outer slots of the focal blade.

5. The pop-up retroreflector of claim 4, wherein each of the plurality of pivotable blades comprises an anti-interference opening at an end of the pivoting slot.

6. The pop-up retroreflector of claim 1, wherein each of the plurality of pivotable blades comprises a flange configured to stop the plurality of pivotable blades from rotating beyond a certain position.

7. The pop-up retroreflector of claim 1, wherein each of the plurality of pivotable blades comprises a first portion and a second portion, wherein the first and second portions are on different planes.

8. The pop-up retroreflector of claim 1, wherein each of the plurality of pivotable blades comprises a first portion and a second portion, wherein the first and second portions are on a same plane.

9. The pop-up retroreflector of claim 1, wherein the focal blade comprises four outer slots and wherein the plurality of pivotable blades comprises four blades.

10. The pop-up retroreflector of claim 1, wherein each load-biased hinge comprises a memory wire folded into a W-shaped pattern when the retroreflector is in the closed position, and wherein the load-biased hinge is configured to unfold into a V-shaped pattern.

11. The pop-up retroreflector of claim 10, wherein the memory wire hinge comprises nitinol.

12. The pop-up retroreflector of claim 1, wherein each load-biased hinge comprises a flat-elastic metal portion, wherein the flat-elastic metal portion is substantially folded in half when the retroreflector is in an undeployed position.

13. The pop-up retroreflector of claim 1, wherein the plurality of pivotable blades comprises two pivotable blades, and wherein the plurality of outer slots comprises two outer slots.

14. The pop-up retroreflector of claim 1, wherein the plurality of pivotable blades comprises four pivotable blades, and wherein the plurality of outer slots comprises four outer slots.

15. The pop-up retroreflector of claim 1, wherein the focal blade and the plurality of pivotable blades comprises a radio frequency reflecting material.

16. The pop-up retroreflector of claim 1, wherein the focal blade and the plurality of pivotable blades are coated with a radio frequency reflecting material.

17. A retroreflector comprising:
   a focal blade having a plurality of outer slots and a center opening having a tab extending toward a center of the opening, wherein the first tab is configured to secure the retroreflector to a dispenser while the first tab is in contact with the dispenser; and
   a plurality of pivotable blades configured to rotate about the plurality of outer slots of the focal blade.

18. The retroreflector of claim 17, further comprises a load-biased hinge coupled to the focal blade and to each of the plurality of pivotable blades, wherein the load-biased hinges is configured to rotate about the plurality of pivotable blades from a closed position into an opened position when the tab is released from the dispenser.

19. The retroreflector of claim 17, wherein the focal blade comprises a plurality of anti-interference opening, each anti-interference opening is located at an end of each of the plurality of outer slots.

* * * * *